Sept. 1, 1925.

L. RIETCHECK 1,552,233

METHOD AND APPARATUS FOR TREATING GRAIN

Original Filed April 2, 1924

Inventor
L. Rietcheck

Patented Sept. 1, 1925.

1,552,233

UNITED STATES PATENT OFFICE.

LEO RIETCHECK, OF GRINNELL, KANSAS.

METHOD AND APPARATUS FOR TREATING GRAIN.

Application filed April 2, 1924, Serial No. 703,837. Renewed July 18, 1925.

*To all whom it may concern:*

Be it known that I, LEO RIETCHECK, a citizen of the United States, residing at Grinnell, in the county of Gove and State of Kansas, have invented certain new and useful Improvements in Methods and Apparatus for Treating Grain, of which the following is a specification.

This invention relates to a device and apparatus for treating grain and has for its principal object to provide a means whereby the weevils or other bugs which are detrimental to the wheat which is deposited in a granary or the like are removed from the grain and destroyed.

One of the important objects of the present invention is to provide an apparatus for receiving the grain wherein the same is provided with means for enabling a supply of a suitable fluid such as the exhaust gases from an internal combustion engine to be discharged into the receptacle containing the grain so as to thoroughly permeate the same.

A further object of the invention is to provide an apparatus for destroying the weevils which have become lodged in the grain contained in the granary or receptacle and which further provides a means for drying the grain after the same has been subjected to dampness caused by rain or water being accidentally discharged into the receptacle.

A further object of the invention is to provide an apparatus for treating grain which is simple in construction, inexpensive, strong and durable, and further, well adapted for the purposes for which it is designed.

Other objects and advantages of this invention will become apparent during the course of the following description.

Figure 1:
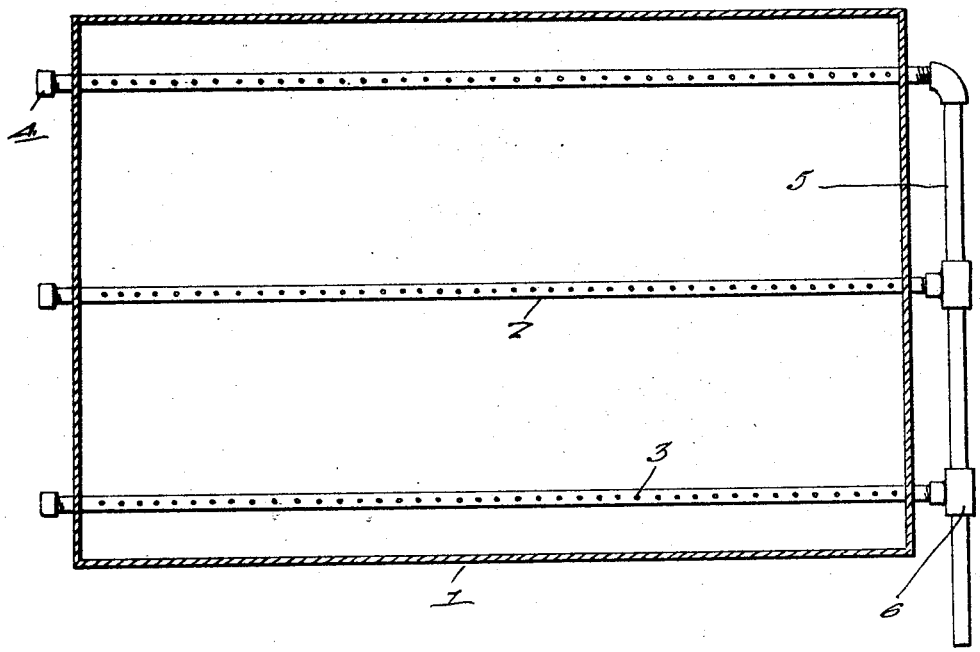
Figure 2:
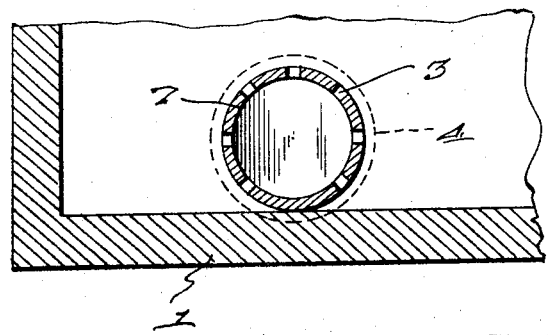

In the accompanying drawing forming a part of this specification and in which like numerals designate like parts throughout the same, Figure 1 is a top plan view of my improved apparatus, and Figure 2 is a detail sectional view taken through one of the perforated pipes.

In the drawing wherein for the purpose of illustration is shown the preferred embodiment of my invention, the numeral 1 designates a receptacle of any well known construction which is provided for receiving and containing the grain. Extending longitudinally through the end of the receptacle 1 and arranged in spaced relation with respect to each other, are the perforated pipes 2. Perforations 3 provided in each of the pipes 2 extend substantially from the bottom portion of each pipe around the sides and top thereof in a manner as clearly shown in Figure 2 of the drawing. The longitudinally extending pipes 2 which are all in the same horizontal plane are further supported in the receptacle 1 on the bottom of the same in the manner as also clearly shown in Figure 2. The end of each of the pipes which extends through an adjacent wall of the receptacle is provided with a removable closure cap 4 thereon in a manner as shown in Figure 1 of the drawing, and the opposite ends of the pipes which extend through the opposite end wall of the casing or receptacle 1, are connected in any suitable manner to the transversely extending pipe 5. Suitable couplings such as are shown at 6 in the drawing are provided for a connection between each of the pipes and the transverse pipe 6. This pipe 6 is primarily intended to convey a fumigating and insect destroying fluid to the aforesaid pipes 2.

With the parts arranged as shown in Figure 1 of the drawing, the receptacle is filled with the grain. The caps 4 are then placed on the outer ends of the pipes 2 and the transverse pipe 6 which is connected to the opposite ends of the pipes is connected up to an internal combustion engine exhaust manifold. The engine is then started so that the exhaust gases therefrom will be discharged into the pipe 6 from which they are emitted into the longitudinally extending pipes 2 supported in the bottom of the receptacle, and the exhaust gases passing through the longitudinally extending pipes 2 will be caused to be directed outwardly through the perforations 3 provided in each of the pipes in all directions so as to thoroughly permeate the grain within the receptacle, thereby destroying any of the weevils or other bugs which have become lodged therein. This method or process of destroying the weevils is kept up for a short length of time so as to thoroughly permeate the grain and insure the same against destruction by the weevils which have become lodged therein.

From the foregoing it will be observed that I have provided a pipe and fitting structure which may be broadly designated as a unit, the same being mainly composed of the three spaced parallel pipes connected together through the medium of the fluid supply pipe and couplings on one end. All of the pipes have their opposite ends extended beyond the opposite or adjacent walls of the container and screw threaded for connection of the couplings and fluid supply pipe at one end and for connection of removable caps at the other ends. Particular emphasis is to be laid on the external disposition of the capped ends of the pipes since this arrangement renders said ends accessible from the exterior. With this arrangement the caps can be removed for permitting selective cleaning of the interiors for unclogging the apertures. Also, the caps can be removed to permit the three pipes, couplings, and fluid supply pipes to be bodily removed from the container without disassembling. Not only this, the caps may be removed for the purpose of attaching air supply tubes or the like (not shown) for aerating and drying the grain within the container. I would also direct attention to the fact that inasmuch as all of the pipes rest directly upon the floor of the container, they are relieved of undue weight from the grain above. These and other features and advantages have doubtless been made apparent by the foregoing description and drawing.

The simplicity in which my apparatus is constructed and the manner in which the grain is treated enables the same to be efficiently and cheaply placed in operation and does not require the use of any complicated machinery in order to carry out the functions and advantages of the invention.

While I have shown the preferred embodiment of my invention it is to be understood that various changes in the size, shape and arrangement of parts may be resorted to without departing from the spirit of the invention and the scope of the appended claim.

Having thus described my invention what I claim is:—

In an apparatus for treating grain, a container for the grain, a fluid conducting unit comprising a plurality of pipes of equal lengths arranged in substantially the same horizontal plane and in spaced parallelism, said pipes resting directly upon the bottom of the container and the opposite ends of the pipes extending through and beyond the adjacent walls of said container to dispose said ends upon the exterior of the container, said extended ends being screw-threaded and portions of the pipes within said container being equipped with a multiplicity of longitudinally and circumferentially spaced apertures through which a grain treating fluid is simultaneously emitted, the spaced positioning of the pipes across the bottom of the container serving to uniformly distribute the treating fluid, couplings connected to the extended ends of the pipes at one side of the container, a fluid supply conduit connected with the couplings for connecting said pipes in assembled relation, and screw-caps removably fitted upon the opposite screw-threaded ends of the pipes, said screw caps being removable from the exterior of the container to permit cleaning of the interiors of the pipes, or to permit said pipes to be slid through the openings in the container without disassembling said unit.

In testimony whereof I affix my signature.

LEO RIETCHECK.